United States Patent [19]
Tanaka

[11] Patent Number: 6,100,876
[45] Date of Patent: Aug. 8, 2000

[54] INFORMATION PROCESSING APPARATUS

[75] Inventor: Hidekazu Tanaka, Tokyo, Japan

[73] Assignee: Sony Corporation, Tokyo, Japan

[21] Appl. No.: 08/023,138

[22] Filed: Feb. 24, 1993

Related U.S. Application Data

[63] Continuation of application No. 07/715,780, Jun. 14, 1991, abandoned.

[30] Foreign Application Priority Data

Jun. 14, 1990 [JP] Japan ................................. P2-156672

[51] Int. Cl.⁷ ..................................................... G09G 5/00
[52] U.S. Cl. ...................................... 345/173; 178/18.06
[58] Field of Search .................................. 340/706, 710, 340/712, 721, 724, 707; 178/18, 19, 18.06, 18.01; 345/159, 173, 179, 174

[56] References Cited

U.S. PATENT DOCUMENTS

| | | | |
|---|---|---|---|
| 3,757,322 | 9/1973 | Barkan et al. | 340/712 |
| 4,034,155 | 7/1977 | Muller et al. | 178/19 |
| 4,574,364 | 3/1986 | Tabata et al. | 340/721 |
| 4,667,182 | 5/1987 | Murphy | 178/18 |
| 4,734,685 | 3/1988 | Watanabe | 340/710 |
| 5,053,757 | 10/1991 | Meadows | 340/712 |

FOREIGN PATENT DOCUMENTS

| | | | |
|---|---|---|---|
| 2139762 | 11/1984 | United Kingdom | 340/710 |
| 2 193 023 | 1/1988 | United Kingdom . | |

OTHER PUBLICATIONS

Brad A. Myers, "A Taxonomy of Window Manager User Interfaces", *IEEE Computer Graphics and Applications*, vol. 8, No. 5, Sep. 1988, New York, NY, USA, pp. 65–84.

*Primary Examiner*—Kent Chang
*Attorney, Agent, or Firm*—Hill & Simpson

[57] ABSTRACT

In an information processing apparatus, a processing mode is switched on the basis of speed of change of coordinate data which is inputted by coordinate data input means comprising a pen and a tablet, the speed of change of the coordinate data being detected during a period over which the pen is pressed down on the tablet, the coordinate data being inputted by electrostatic capacitance between the pen and the tablet, the electrostatic capacitance being effective up to a predetermined distance between the pen and the tablet. This allows the speed of the pen to be determined during a first period when the pen is contacting the tablet, and/or during a second period when the pen is just out of contact with the tablet.

6 Claims, 10 Drawing Sheets

INFORMATION PROCESSING APPARATUS

This is a continuation of application Ser. No. 07/715,780, filed Jun. 14, 1991, now abandoned.

BACKGROUND OF THE INVENTION

1. Field of the Invention

The present invention relates to information processing apparatus, for example an information processing apparatus which is operable to process predetermined information on the basis of coordinate data inputted from a tablet, for example.

2. Description of the Prior Art

In this type of information processing system, it has previously been proposed to control entry of and changes to various kinds of personal information, such as address book, telephone directory and schedule table, in a similar manner to a pocket book. Such systems are disclosed in U.S. patent application Ser. No. 621,898 having a common assignee and in the present assignee's Japanese Patent Application No. 2 (1990)-84318.

Figure 1:
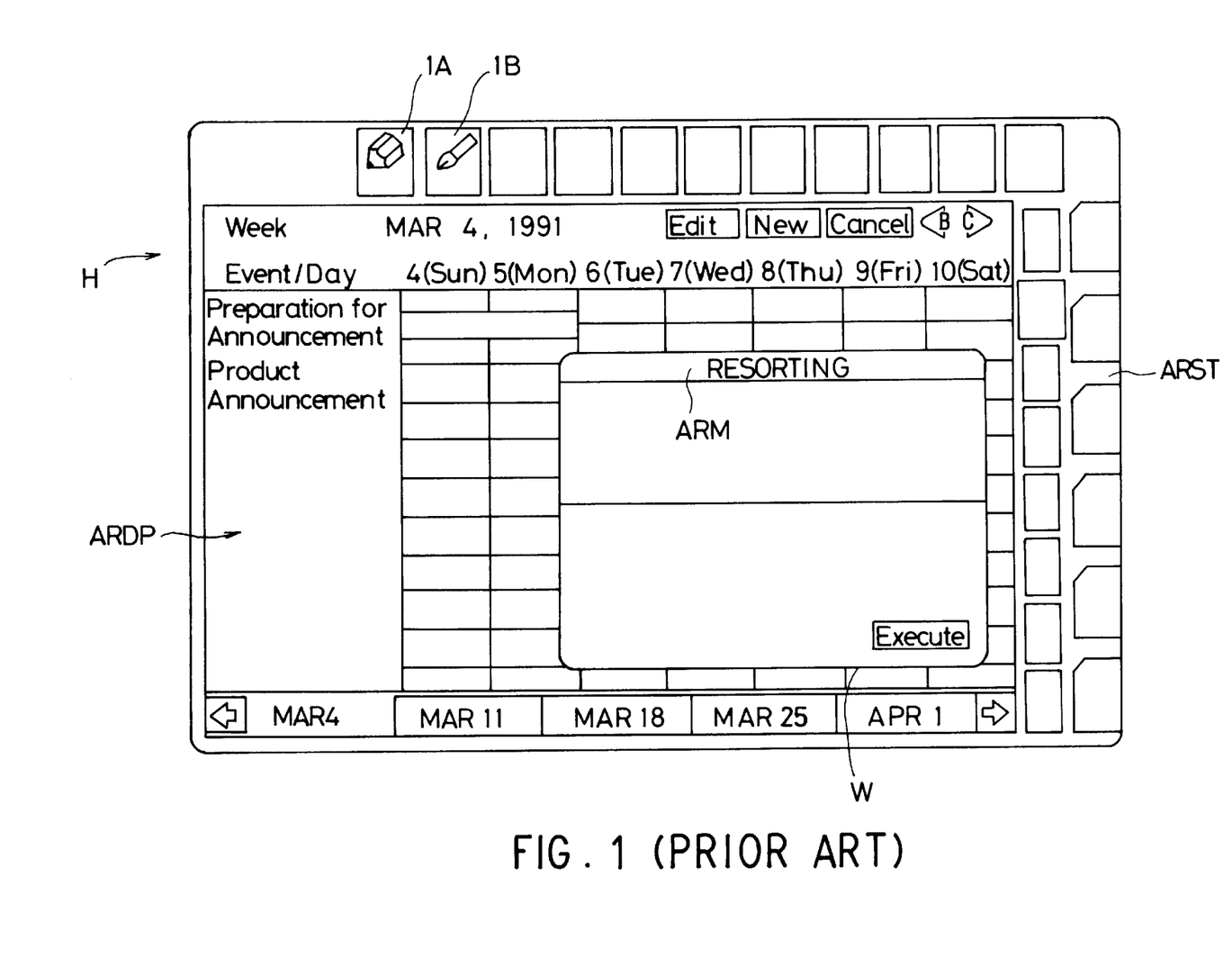
FIG. 1 is a schematic diagram showing the image on a display screen of a previously-proposed information processing system.

In such an information processing system, the display screen H is switched according to the user's selection operation as illustrated in FIG. 1 of the accompanying drawings, and icons 1A, 1B, . . . are displayed at the upper margin and the right hand margin of the display screen H.

The user pens down the pen (not shown) on a required icon 1A, 1B, . . . , and then the pen is moved to a predetermined position on the display screen H. This causes a window W which corresponds to the selected icon to be displayed at the traveled position, and according to an indication within the window, personal information such as a schedule can be controlled.

In this kind of information processing system, the user may wish to change the display position of the window W. Also, the user may wish to store the displayed window W.

In the latter case, the pen is penned down on a predetermined area ARM of the window W, and then it is moved to the display area ARST (hereinafter referred to as standby area) of the icons 1A, 1B, . . . , where the pen is penned up, causing the window W to be stored.

On the other hand, when the pen is penned up within an area ARDP (hereinafter referred to as display area of the page data) in the display screen H except for the standby area ARST, the window W is moved to the position at which the pen has been penned up.

For this reason, it is necessary for the user to repeat the complex operation to move the pen to the standby area ARST for storing the window W, and hence the information processing system is relatively complicated to use.

One technique to alleviate this problem would be to enlarge the standby area ARST, but the larger the standby area ARST, the smaller the display area ARDP of the page data. Thus, personal information would have to be displayed in a smaller display area.

Alternatively, a window storing instruction icon might be displayed within the window W, but this technique is not practical since the display area within the window W is reduced by the area within the window W on which the icon is displayed.

SUMMARY OF THE INVENTION

In view of the foregoing, an object of this invention is to provide an information processing apparatus which is capable of improving facility of use compared to the previously-proposed system.

According to one aspect of the invention there is provided an information processing apparatus comprising: coordinate information input means for inputting coordinate data; processing means for processing said coordinate data; detecting means for detecting speed of change of said input coordinate data sequentially; and switching means for switching a processing mode of said apparatus according to said detected speed of change.

In the preferred information processing apparatus, predetermined information is processed on the basis of coordinate data x, y inputted through coordinate inputting means in which the speed of change of the coordinate data x and y is detected, and the processing mode is switched according to the result of the detection.

More specifically, in the preferred information processing apparatus, the speed of change of the coordinate data x and y is detected at penning down and/or after penning up, and the processing mode is switched according to the result of the detection.

Switching of the processing mode on the basis of the speed of change of the coordinate data x and y enables the operation mode to be switched by moving the pen or the like at a sufficiently high speed.

In this event, if the speed of change of the coordinate data x and y after penning up is referred to, the operation mode may be switched by moving the pen, for example, in a jumped or reverse direction.

As described, embodiments of the present invention are capable of switching the processing mode according to requirements by switching the mode on the basis of the speed of change of the coordinate data, and hence are capable of providing information processing apparatus with improved facility.

The above, and other objects, features and advantages of this invention will be apparent from the following detailed description of illustrative embodiments which is to be read in connection with the accompanying drawings, in which like parts are designated by like reference numerals or characters.

BRIEF DESCRIPTION OF THE DRAWINGS

In the accompanying drawings:

FIG. 4 (formed of FIGS. 4A and 4B) is a flow diagram illustrating the operation of the embodiment of FIG. 3;

FIG. 6 (formed of FIGS. 6A to 6D) is a flow chart showing the operation of the embodiment of FIG. 5.

DETAILED DESCRIPTION OF EMBODIMENTS OF THE INVENTION

Figure 2:
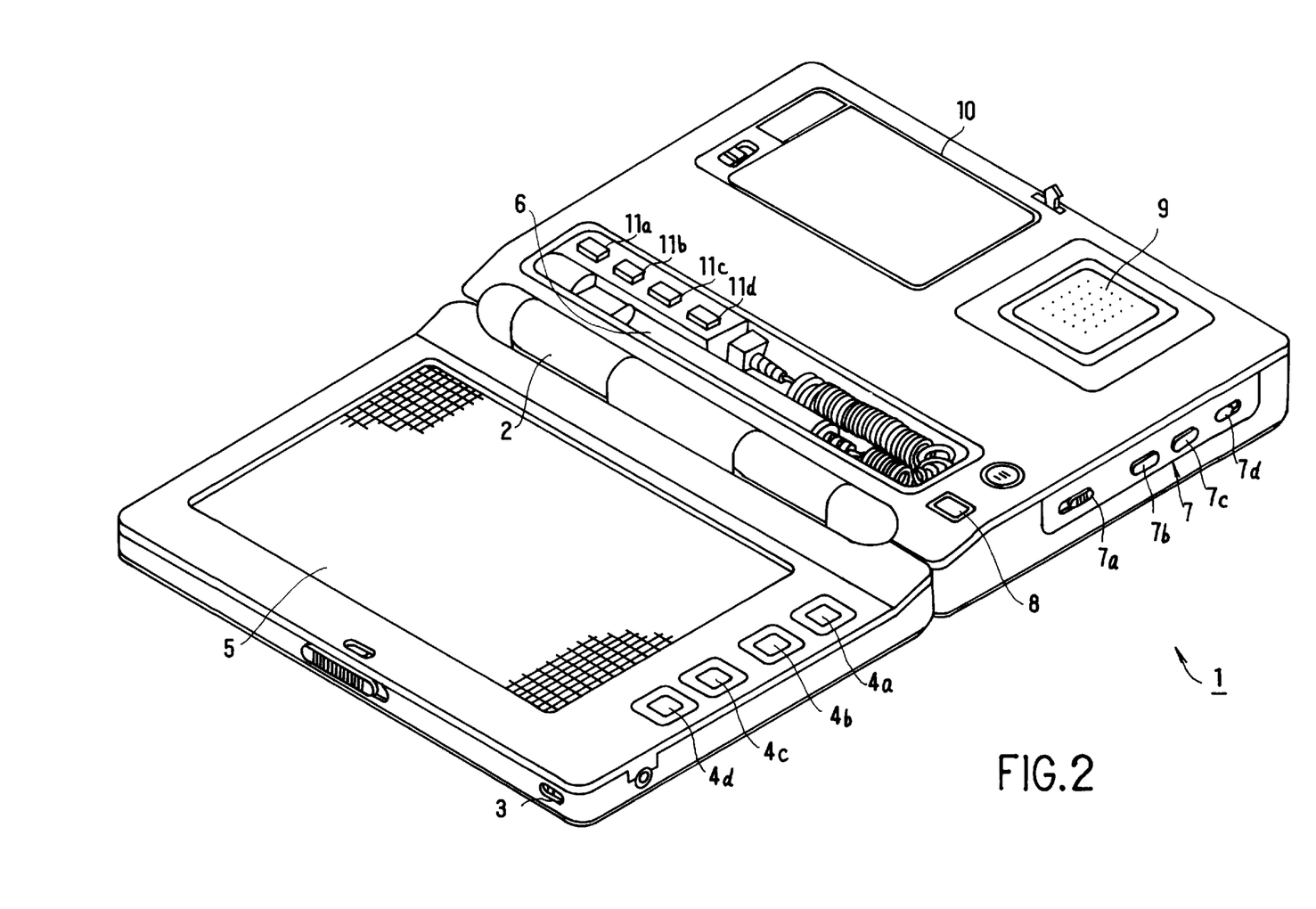
FIG. 2 is a perspective view of an information processing system.

Preferred embodiments of the present invention will now be described with reference to the accompanying drawings:

(1) One embodiment
(1-1) Overall configuration of the information processing system In FIG. 2, there is shown an information processing system 1 which is made portable by arranging casings A and B to be foldable by means of a hinge 2.

The casing B is provided at its front with a microphone 3, by means of which voice messages can be inputted.

On the upper surface of the casing B, there are arranged key switches 4a to 4d, by which operation of the information processing system 1 can be switched according to requirements.

A liquid crystal display panel 5, which has a transparent static capacity type tablet mounted on it, is arranged in the casing B. It is possible to display desired personal information through the liquid crystal display panel 5 as well as graphics matter such as windows and icons.

A pen 6, which can be stored in a recess in the casing A when not in use, is penned down on the tablet as a result of which coordinate data is inputted through the tablet. This enables display positions of windows to be switched and the personal information to be controlled according to requirements on the basis of the coordinate data.

The casing A is provided at its right side edge with actuating elements 7, which may consist of a recording actuating element 7a, a reproduction actuating element 7b, a stop actuating element 7c and a volume adjustment actuating element 7d; by operating the actuating elements 7, a voice which has been picked up by the microphone 3 can first be recorded and then reproduced.

On the upper surface of the casing A, there is arranged a loudspeaker 9 as well as a power switch 8, and by means of this loudspeaker 9, the voice which has been picked up by the microphone 3 may be monitored. In addition, by placing the mouthpiece of a telephone against the loudspeaker 9, personal information may be transmitted along the telephone line.

Furthermore, on the upper surface of the casing A, there are arranged key switches 11a to 11d in addition to an electric cell receiving portion 10. In addition to the key switches 4a to 4d, these further key switches 11a to 11d enable the operation of the information processing system 1 to be switched according to requirements.

Figure 3:
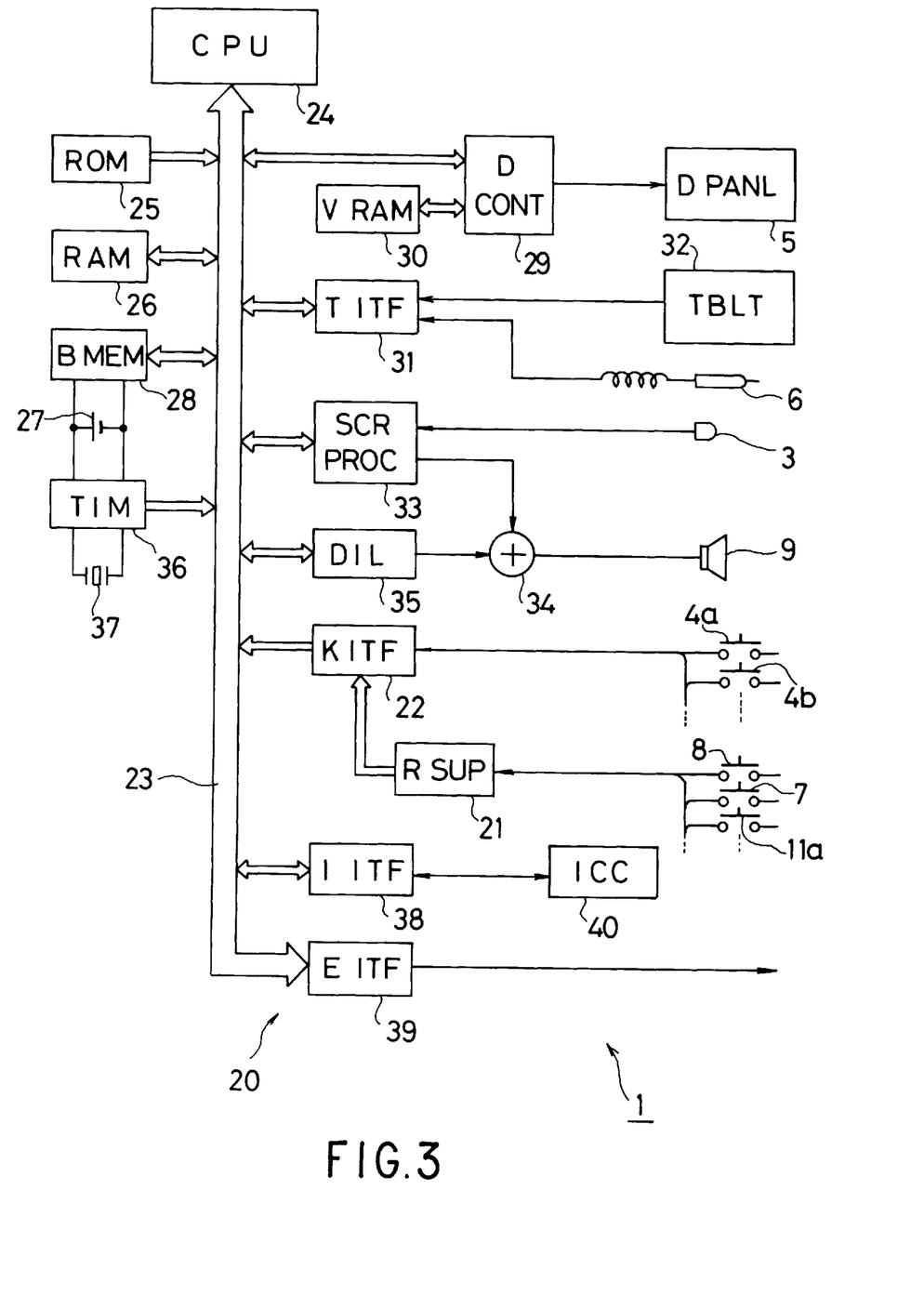
FIG. 3 is a schematic block diagram showing a signal processing part which can perform window storing according to one embodiment of the present invention.

In a signal processing circuit of the information processing system 1 as shown in FIG. 3, the power switch 8, the actuating elements 7 and the key switches 11a to 11d are connected to a power supply circuit 21, and this enables the information processing system 1 to be turned on by switching the power switch 8 on.

When the actuating elements 7 and the key switches 11a to 11d are activated in addition to the power supply operation, the power supply circuit 21 sends control data to a key interfacing circuit 22.

The key interfacing circuit 22 sends out the control data, which has been sent from the power supply circuit 21, to a central processing unit (CPU) 24 through a bus 23, and the operation of the information processing system 1 is switched as a result.

The key interfacing circuit 22 sends out the control data in a similar manner in the case when the key switches 4a to 4d are turned on, so that the operation of the information processing system 1 is switched in response to the on operation of the key switches 4a to 4d.

The CPU 24 can access a read only memory (ROM) 25 and a random access memory (RAM) 26 through the bus 23, and the processing program of the ROM 25 is executed thereby in response to the operation of the actuating elements.

In this event, the CPU 24 can renew personal information stored in a backup memory circuit 28 or may register it in the backup memory circuit 28 by accessing the latter, the backup memory circuit 28 being connected to a backup cell 27. The personal information is displayed on the liquid crystal display panel 5 as required.

More specifically, the CPU 24 outputs personal information, which has been accessed according to a processing mode, to a display controller 29, and thereby renews the contents of a video memory circuit (V-RAM) 30, so that the display on the liquid crystal display panel 5 is renewed.

Furthermore, the CPU 24 reads in coordinate data of the pen 6, when penned down on a tablet 32, through a tablet interface circuit 31, and is operable to move a window, for example, to the penned up position or to store the window.

This causes the operation mode of the information processing system 1 to change, for example to switch to a mode of the schedule as described with reference to FIG. 1, and if necessary, a predetermined window W can be displayed for moving the pen 6 along the surface of the tablet 32 to a desired position after the pen 6 is penned down on an icon.

The CPU 24 may also control a solid state component record processing circuit 33 according to the control data outputted from the key interfacing circuit 22, as a result of which a voice message picked up by the microphone 3 is recorded in the backup memory circuit 28 and, if necessary, reproduced from the loudspeaker 9 through an adder circuit 34.

The CPU 24 additionally controls a dialer circuit 35 which generates dual tone signals of the so-called push phone dialing system to the loudspeaker 9 through the adder circuit 34 on the basis of phone number information which is included in the stored personal information.

The CPU 24 is also provided with time information from a timer 36 which is maintained actuated by the backup cell 27 with reference to a crystal resonator 37, and thus personal information, such as the schedule, can be controlled with reference to the time information.

The bus 23 is connected to an integrated circuit (IC) card interface circuit 38 and an extension interface circuit 39. This enhances the processing capacity of the information processing system 1 by allowing an IC card 40 to be connected to the IC interface circuit 38, and enables modem communication through the extension interface circuit 39 according to requirements.

(1-2) Storing of Windows

Figure 4A:
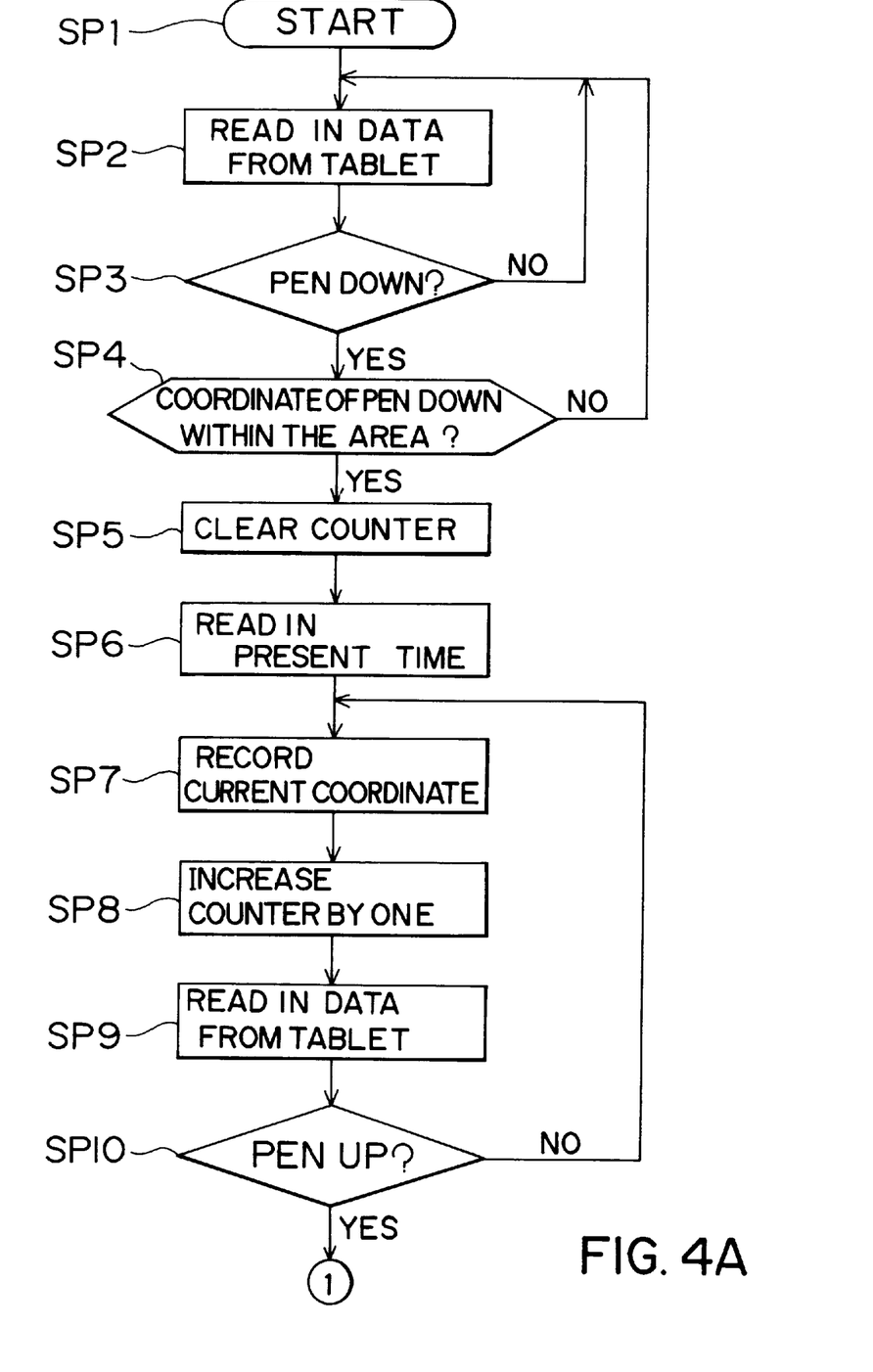
Figure 4B:
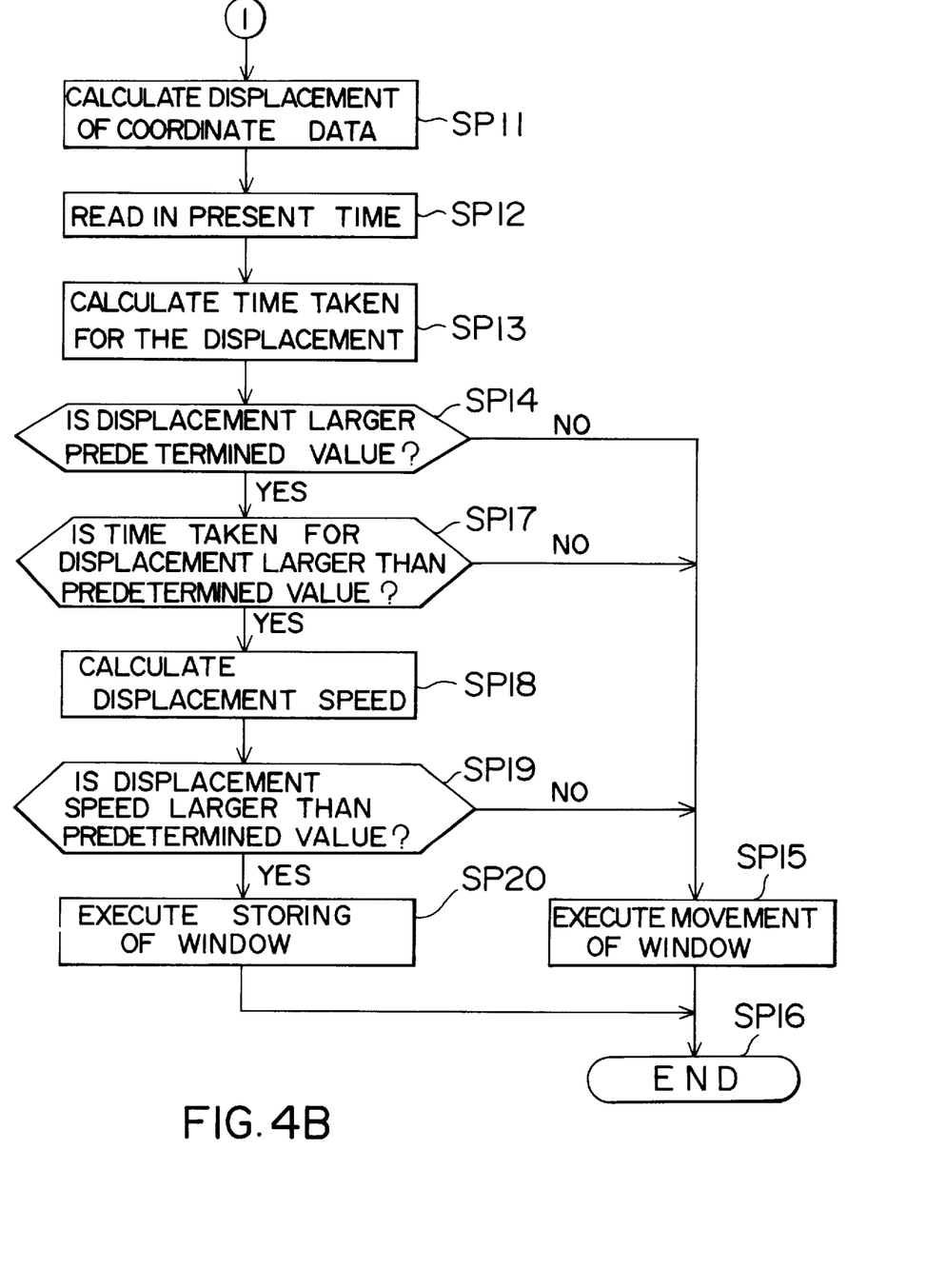

In this embodiment, the CPU 24 executes the routine shown in FIG. 4 starting by displaying a window W, and then moving the window W or storing the window W according to requirements.

More specifically, the CPU 24 moves from a "start" step SP1 to a step SP2 in which coordinate data is read in from the tablet interface circuit 31 thereby to detect the coordinate data of the pen 6.

The CPU 24 then proceeds to a step SP3 which judges according to the output data from the tablet interface circuit 31 whether or not the pen 6 is penned down, that is, whether the pen 6 is in contact with the tablet 32.

When a negative result is given in the step SP3, the CPU 24 returns to the step SP2, and then the loop of the steps SP2-SP3-SP2 is repeated until the pen 6 is penned down.

However, when the pen 6 is in fact penned down, an affirmative result is provided in the step SP3, and thus the CPU 24 goes to a step SP4 in which it makes a judgement as to whether or not the pen-down position is within the predetermined area of the window W.

The judgement is whether or not pen-down has taken place in the display area ARM (FIG. 1) of contents to be processed provided at a top portion of the window W by making a judgement as to whether or not the coordinate data X0 and Y0 which have been read in the step SP2 satisfy the following conditions:

$$\text{XLOW} \leq \text{X0} \leq \text{XHIG} \tag{1}$$

$$\text{YLOW} \leq \text{Y0} \leq \text{YHIG} \tag{2}$$

XLOW and XHIG defining the X-coordinates of the boundary of the display area ARM, and YLOW and YHIG defining the Y-coordinates.

When a negative result is obtained in the step SP4, the CPU 24 returns to the step SP2, and thus the loop of the steps SP2-SP3-SP4-SP2 is repeated until pen-down takes place in the display area ARM.

However, when pen-down has taken place in the display area ARM, an affirmative result is obtained in the step SP4, and thus the CPU 24 goes to a step SP5 to clear a counter. Then, the CPU 24 proceeds to a step SP6 in which the present time t0 from the timer 36 is read in and recorded as the time at which the counter value is 0.

Subsequently, the CPU 24 goes to a step SP7 in which the coordinate data x0 and y0 which have been read in the step SP2 are recorded as coordinate data of the counter value 0.

Then, the CPU 24 proceeds to a step SP8, incrementing the value of the counter by one to renew the counter value, and thereafter proceeds to a step SP9.

In the step SP9, the CPU 24 accepts coordinate data x1 and y1 from the tablet interface circuit 31, as a result of which the coordinate data of the counter value 1 is read in. Then, the CPU 24 goes to a step SP10, in which it is judged whether or not pen-up has been carried out.

When a negative result is obtained in the step SP10, the CPU 24 returns to the step SP7. Thus, the loop of the steps SP7-SP8-SP9-SP10-SP7 is repeated until pen-up is performed.

When pen-up has been carried out, an affirmative result is obtained in the step SP10, and then the CPU 24 proceeds to a step SP11 in which displacements $\Delta x\text{DOWN}$ and $\Delta y\text{DOWN}$ are detected by executing the following equations:

$$\Delta x DOWN = xUP - xDOWN \tag{3}$$

$$\Delta y DOWN = yUP - yDOWN \tag{4}$$

on the basis of the coordinate data xn and yn at the pen-up time tn, and the coordinate data x0 and y0 at the counter value 0.

Thus, in the CPU 24, the loop of the steps SP7-SP8-SP9-SP10-SP7 is repeated until pen-up is performed, and thereby the displacement of the pen 6 between pen-down and pen-up can be detected on the basis of the x and y coordinate data.

Subsequently, the CPU 24 proceeds to a step SP12 in which the pen-up time tn is registered by reading in the present time from the timer 36. Then, the CPU 24 proceeds to a step SP13, operation of the following equation being executed on the basis of the time t0 at the counter value 0 and the present time tn:

$$\Delta t = tn - t0 \tag{5}$$

Thus, the CPU 24 detects the time $\Delta t$ between pen-down and pen-up, and then proceeds to a step SP14, checking whether or not the displacements $\Delta x$ and $\Delta y$ are more than a predetermined value.

This judgement is carried out according to whether or not the following condition is met:

$$|\Delta xDOWN| + |\Delta yDOWN| > 10 \text{ (mm)} \tag{6}$$

When a negative result is obtained in the step SP14, the CPU 24 goes to a step SP15, the window W being moved to the position at which pen-up has taken place, and thereafter the CPU 24 proceeds to a step SP16 to terminate the routine.

On the other hand, when an affirmative result is obtained in the step SP14, the CPU 24 proceeds to a step SP17 in which it judges whether or not the time $\Delta t$ between pen-down and pen-up is larger than a predetermined time interval.

This judgement is made according to whether or not the following condition is met:

$$\Delta tDOWN > 2 \text{ (sec)} \tag{7}$$

When a negative result is obtained in the step SP17, the CPU 24 goes to the step SP15 in which the window W is moved to the position at which pen-up has taken place. Then, the CPU 24 proceeds to the step SP16 and terminates the routine.

On the other hand, when an affirmative result is obtained in the step SP17, the CPU 24 proceeds to a step SP19, executing operation of the following equation on the basis of the time $\Delta t$ between pen-down and pen-up and the displacements $\Delta x$ and $\Delta y$, thereby detecting the travel speed v of the pen 6 from pen-down to pen-up.

$$vDOWN = \frac{\Delta xDOWN + \Delta yDOWN}{\Delta tDOWN} \tag{8}$$

Then, the CPU 24 proceeds to a step SP19 in which it judges whether or not the following condition is satisfied:

$$v > 300 \text{ (mm/sec)} \tag{9}$$

As a result, when the travel speed v of the pen 6 is relatively slow, the CPU 24 goes to the step SP15 in which the window W is moved, and then proceeds to the step SP16 for terminating the routine.

On the other hand, when the travel speed v of the pen 6 is relatively fast, meeting the condition (9), an affirmative result is obtained in the step SP19, and thus the CPU 24 goes to a step SP20 in which the window W is stored. Then, the CPU 24 proceeds to the step SP16 to terminate the routine.

In summary, in this embodiment, the operation mode is switched on the basis of the travel speed v of the pen 6; the window W is stored for a relatively fast travel speed v while the window W is merely moved as with the previously-proposed technique for a relatively slow travel speed v.

Thus, the window W can be stored merely by moving the pen 6 at a relatively high speed after penning down on the window W, without repeating complicated operations to move the pen to the standby area ARST as in the previously-proposed technique. This enables the operation of the information processing system 1 to be simplified, so that the information processing system 1 is improved in use.

In practice, the operation of moving the pen 6 at a relatively high speed is found to be a natural way for a user to erase the windows W from the display screen, as compared to the previously-proposed operation of having to move the pen 6 to the standby area ARST.

Thus, the operation mode is switched on the basis of the traveling speed v, and the window W is stored when the travel speed v is relatively fast. This not only simplifies the operation but significantly enhances the facility of this operation compared to the previous technique, and hence the practicality of the information processing system 1 can be improved considerably.

Moreover, it is not necessary to display the standby area ARST in the display of the windows W, and hence the display area ARDP of the page data can be enlarged by omitting the display of the standby area ARST. This further enhances the facility of the information processing system 1.

The operation to switch the operation mode on the basis of the travel speed of the pen 6 in such a manner can be realized with ease merely by modifying part of the standard processing program without adding extra peripheral circuits. Thus, it is possible to provide the information processing system 1 with an enhanced facility without further complicating its construction.

(1-3) Operation of the embodiment

In the information processing system 1 with the foregoing construction, the operation mode thereof is selected by turning on a corresponding one of the key switches 4a to 4d and 11a to 11d, whereupon the desired personal information is displayed on the display panel 5.

In this state, the pen 6 is penned down on a predetermined icon, and is then moved to the display area ARDP, so that the window W derived from that icon is displayed at the position to which the pen 6 has been moved.

When the pen 6 is moved at a sufficiently high speed after being penned down on a predetermined area ARM of the window W, an affirmative result is obtained in the step SP19 in the CPU 24, and the window W is thereby stored.

On the other hand, when the pen 6 is moved relatively slowly, a negative result is obtained in the step SP19, and thus the CPU 24 goes to the step SP15 in which the window W is moved to the pen-up position.

(1-4) Advantageous effects of the embodiment

According to the above-described construction, the operation mode is switched on the basis of the travel speed of the pen 6, and in the case when the travel speed of the pen 6 is relatively fast, the window W is stored, whereas in the case of a relatively slow travel speed, the window W is merely moved as in the previous technique. This enables the previously-proposed complicated storing operation of the window W to be simplified, and hence the information processing system 1 is enhanced in facility.

(2) Second embodiment

In the case when coordinate data is inputted by moving the pen on the tablet, the travel speed of the pen tends to become faster as the user becomes familiar with the system.

For this reason, the window W might be erroneously stored when the processing mode is switched solely on the basis of the travel speed of the pen 6.

Figure 5:
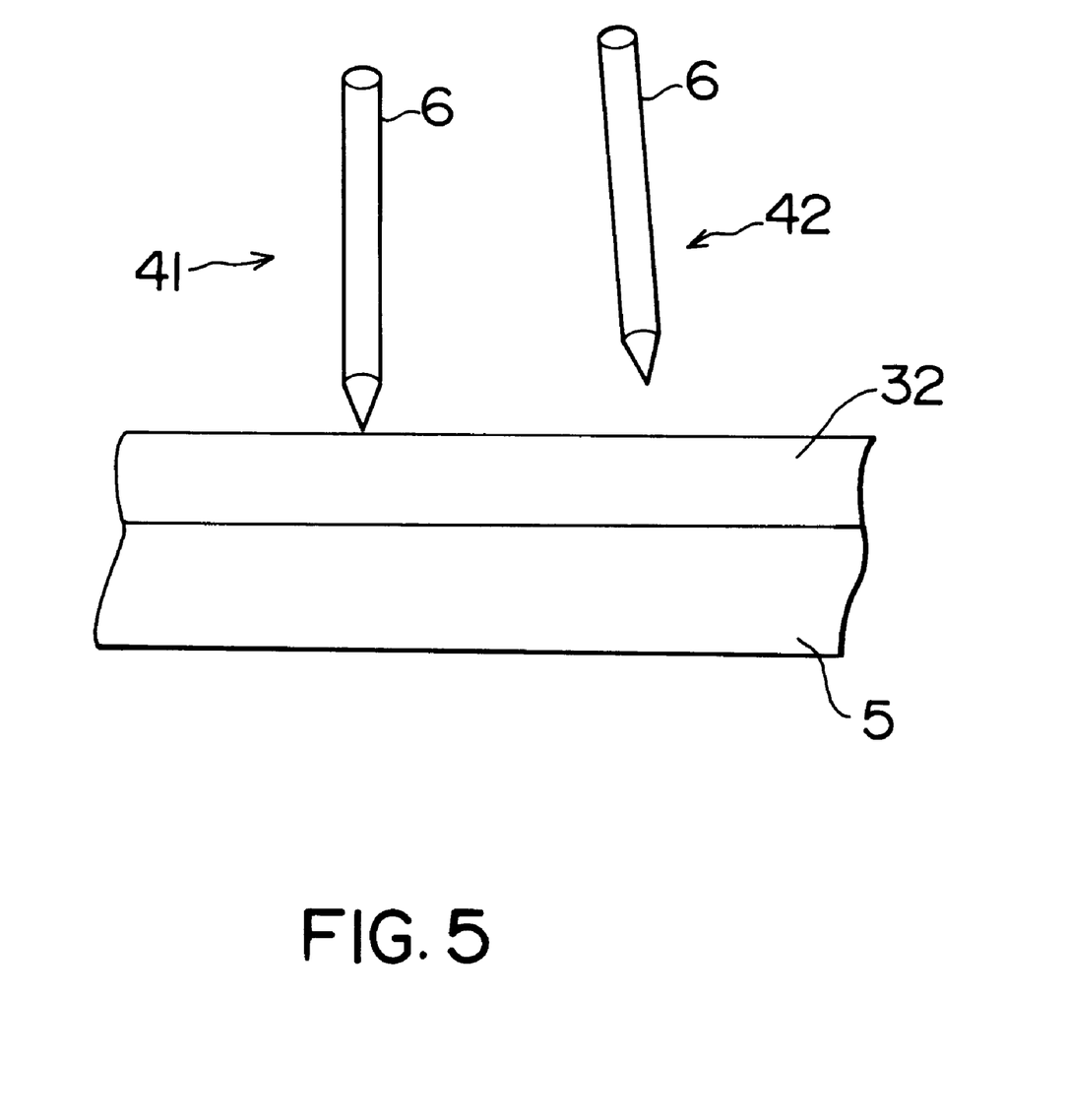
FIG. 5 is a schematic diagram illustrating the principle of detection of the coordinate data according to a second embodiment of the invention.
Figure 6A:
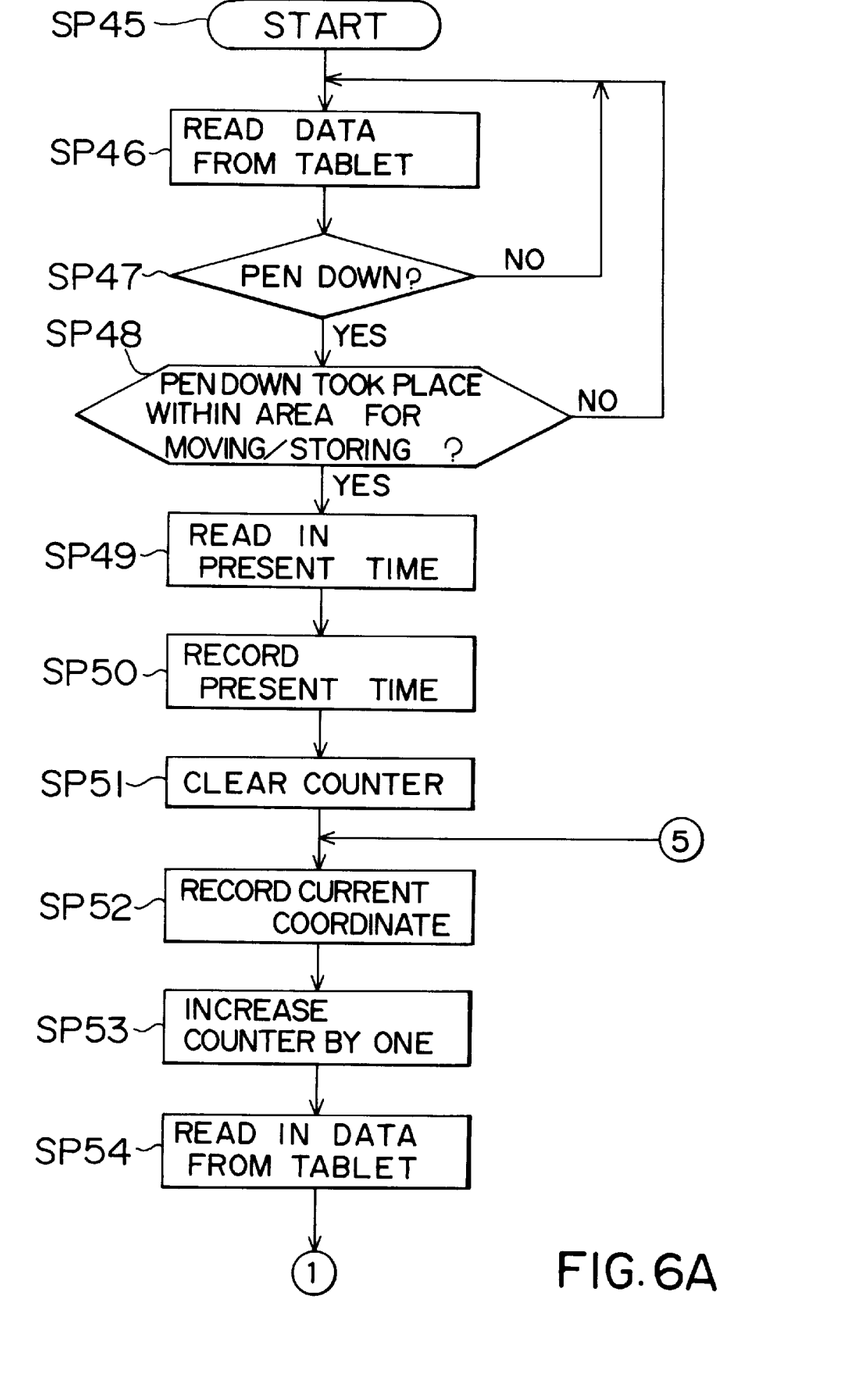
Figure 6B:
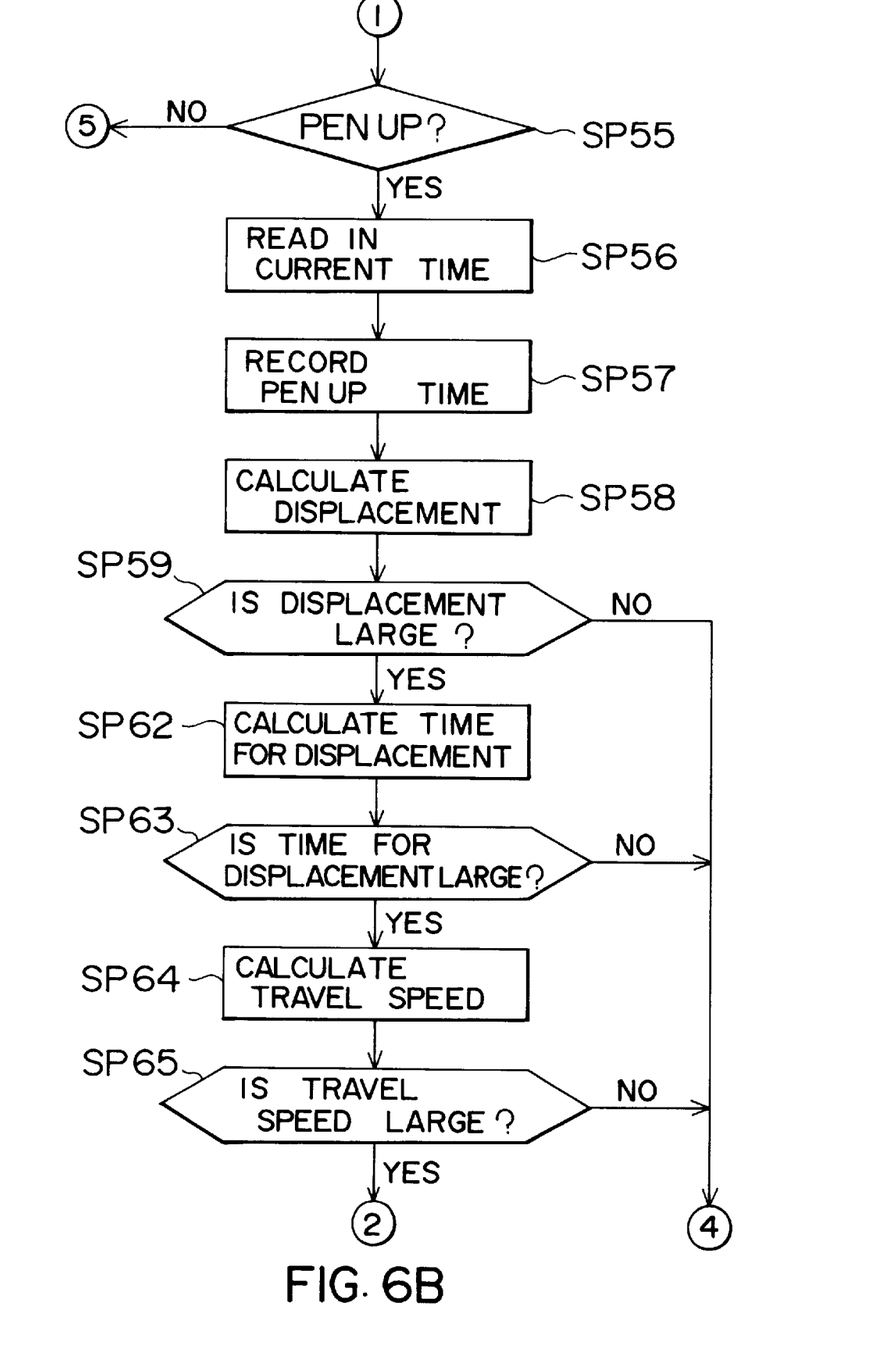
Figure 6C:
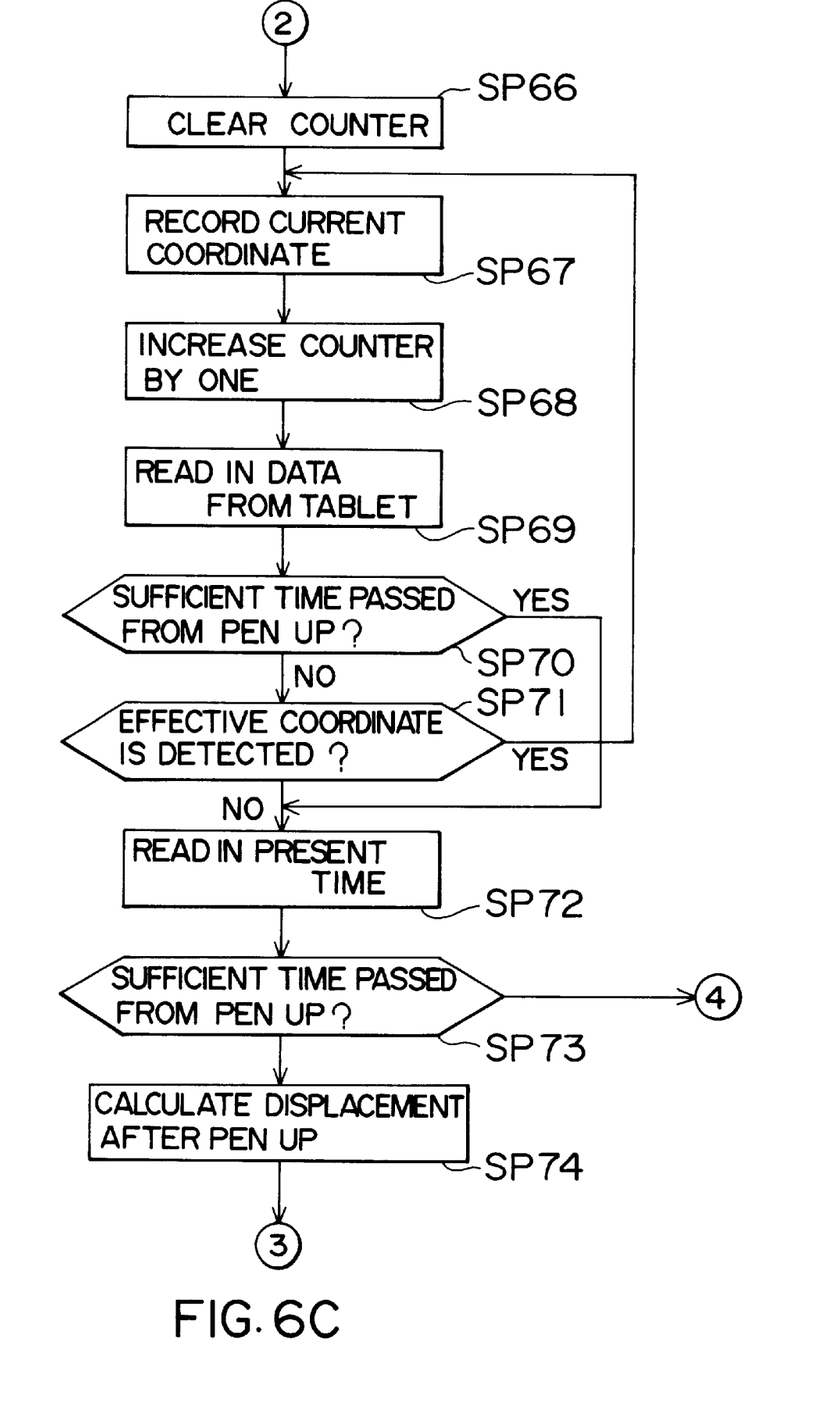
Figure 6D:
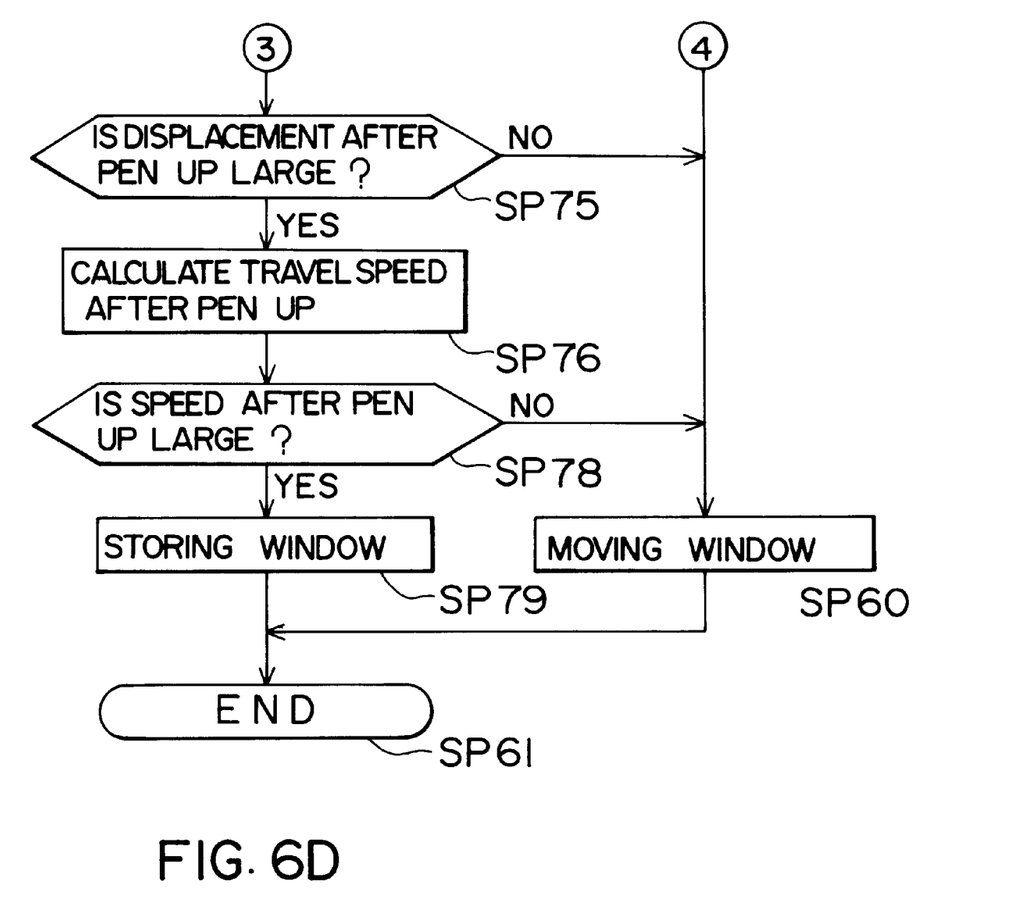

To avoid this, in the second embodiment, the processing mode is switched according to both post-pen-up travel speed and the travel speed of the pen 6 being moved in contact with the tablet 32.

More specifically, in the electrical capacitance type tablet 32 as shown in FIG. 5, the coordinate data of the pen 6 can be detected not only in the case when the pen 6 is in contact with the tablet 32 (indicated by the reference numeral 41) but also in the condition of the pen 6 being held a small distance (such as several millimeters) from the tablet 32 (designated by the reference numeral 42). This is due to capacitive coupling being maintained between the pen 6 and the tablet 32. In the ordinary coordinate inputting unit, the coordinate data of the pen 6 when out of contact with the tablet 32 is ignored.

For these reasons, in the tablet interfacing circuit 31, not only coordinate data in the case of the pen 6 moving in contact with the tablet 32 but also coordinate data in the condition of the pen 6 being just above the tablet 32 (floating) are outputted to the CPU 24 as well as discriminating data of contact and non-contact of the pen 6. This discriminating data can readily be provided, for example, by a switch in the tip of the pen 6, the switch being responsive to contact by the tip.

In response to this, the CPU 24 executes the routine shown in FIG. 6 on the basis of the output data of the tablet interfacing circuit 31 in a state of displaying a window W, and thereby stores the window W according to the user's operation.

More specifically, the CPU 24 proceeds from a "start" step SP45 to a step SP46 in which coordinate data is read in from the tablet interface circuit 31 thereby to detect coordinate data XDOWN and YDOWN of the pen 6.

Then, the CPU 24 proceeds to a step SP47 in which it is judged according to the output data from the tablet interface circuit 31 whether or not the pen 6 has been penned down. When a negative result is obtained here, the CPU 24 returns to the step SP46, and then the loop of the steps SP46-SP47-SP46 is repeated until the pen 6 is penned down.

When however the pen 6 has been penned down, an affirmative result is provided in the step SP47, and then the CPU 24 goes to a step SP48 where, according to the coordinate data XDOWN and YDOWN read in the step SP46, it makes a judgement as to whether or not the pen-down position is within the display area ARM of the window W. This can be done in similar manner to the step SP4 in FIG. 4.

When a negative result is obtained in the step SP48, the CPU 24 returns to the step SP46, and thus the loop of the steps SP46-SP47-SP48-SP46 is repeated until pen-down has taken place in the display area ARM.

When pen-down has taken place in the display area ARM, an affirmative result is obtained in the step SP48, and thus the CPU 24 goes to a step SP49, in which it reads in the present time t0 from the timer 36. Then it proceeds to a step SP50 in which the time t0 is recorded as the time tDOWN of pen-down.

Subsequently, the CPU 24 goes to a step SP51 in which a counter is cleared, and then proceeds to a step SP52 where the coordinate data xDOWN and yDOWN are recorded as coordinate data at the counter value 0. Thereafter, the operation proceeds to a step SP53.

In the step SP53, the CPU 24 increments the counter by one, and then proceeds to a step SP54 in which the coordinate data at that counter value is read in from the tablet interfacing circuit 31.

Then, the CPU 24 goes to a step SP55 in which it is judged whether or not pen-up has occurred. When a negative result is obtained here, the CPU 24 returns to the step SP52. Thus, the loop of the steps SP52-SP53-SP54-SP55-SP52 is repeated until pen-up is performed.

When pen-up has been detected, an affirmative result is obtained in the step SP55, and thus the CPU 24 proceeds to a step SP56 in which the present time tUP is read in. Then, in a step SP57, the time tUP is recorded as the pen-up time.

Subsequently, in a step SP58, the CPU 24 detects displacements $\Delta x DOWN$ and $\Delta y DOWN$ by executing the following equations:

$$\Delta x DOWN = x UP - x DOWN \qquad (10)$$

$$\Delta y DOWN = y UP - y DOWN \qquad (11)$$

on the basis of the coordinate data xUP and yUP at the pen-up time tUP, and xDOWN and yDOWN at the pen-down time tDOWN.

Thus, in the CPU 24, the loop of the steps SP52-SP53-SP54-SP55-SP52 is repeated until pen-up is performed, and thereby the displacement of the pen 6 from pen-down to pen-up can be detected with reference to the x and y coordinate data.

Subsequently, the CPU 24 goes to a step SP59, checking whether or not the displacements ΔxDOWN and ΔyDOWN are more than a predetermined value by judging whether or not the following condition is satisfied:

$$|\Delta xDOWN|+|\Delta yDOWN|>10 \text{ (mm)} \tag{12}$$

When a negative result is obtained in the step SP59, the CPU 24 goes to a step SP60, the window W being moved to the position at which pen-up has taken place, and thereafter the CPU 24 proceeds to a step SP61 to terminate the routine.

On the other hand, when an affirmative result is obtained in the step SP59, the CPU 24 proceeds to a step SP62 in which a time ΔtDOWN is detected on the basis of the pen-down time tDOWN and the pen-up time tUP, the time ΔtDOWN being the time interval between pen-down and pen-up. Then, the CPU 24 goes to a step SP63 and judges whether or not the time ΔtDOWN is larger than a predetermined time by judging whether or not the following condition is met:

$$\Delta tDOWN>0.2 \text{ (sec)} \tag{13}$$

When a negative result is obtained in the step SP63, the CPU 24 goes to the step SP60 in which the window W is moved to the position at which pen-up has taken place. Then, the CPU 24 goes to the step SP61 and terminates the routine.

On the other hand, when an affirmative result is obtained in the step SP63, the CPU 24 proceeds to a step SP64, executing operation of the following equation on the basis of the time ΔtDOWN between pen-down and pen-up and the displacements ΔxDOWN and ΔyDOWN for detecting the travel speed vDOWN of the pen 6 from pen-down to pen-up:

$$vDOWN = \frac{\Delta xDOWN + \Delta yDOWN}{\Delta tDOWN} \tag{14}$$

Then, the CPU 24 goes to a step SP65 in which it judges whether or not the following condition is satisfied:

$$vDOWN>300 \text{ (mm/sec)} \tag{15}$$

As a result, when the travel speed vDOWN of the pen 6 is relatively slow, the CPU 24 goes to the step SP60 in which the window W is moved, and then proceeds to the step SP61 for terminating the routine.

On the other hand, in the case when the travel speed vDOWN of the pen 6 is sufficiently fast, an affirmative result is obtained in the step SP65, and thus the CPU 24 goes to a step SP66, in which the counter is cleared. Then, the CPU 24 proceeds to a step SP67 to record the pen-up coordinate data xUP and yUP.

Subsequently, the CPU 24 goes to a step SP68 in which the counter is incremented by one, and then proceeds to a step SP69 for reading in coordinate data from the tablet interfacing circuit 31.

Thus, the CPU 24 consecutively detects coordinate data after pen-up thereby to detect the speed of the change of the coordinate data.

More specifically, the CPU 24 proceeds to a step SP70 in which it is judged whether or not sufficient time has passed from pen-up.

This judgement is made by checking whether or not the following condition is satisfied for the present time t:

$$t-tUP>0.5 \text{ (sec)} \tag{16}$$

When a negative result is obtained in the step SP70, the CPU 24 proceeds to a step SP71 in which it is judged whether or not the tablet interfacing circuit 31 is in a condition to be sufficiently capable of detecting coordinate data. More specifically, if the pen 6 is too far from the tablet 32, it is not possible for the electrical capacitance tablet to detect the coordinate data, since the capacitance will be too low to be detected.

For this reason, the CPU 24 returns to the step SP67 when an affirmative result is obtained in the step SP71, that is when the pen 6 comes close to the tablet 32 and is thus in a coordinate data detectable condition.

In this condition, the CPU 24 repeats the processing of the steps SP67-SP68-SP69-SP70-SP71-SP67 until the pen 6 is moved far away from the tablet 32. When the coordinate data becomes undetectable, a negative result is obtained in the step SP71, and the CPU 24 goes to a step SP72.

Similarly, when sufficient time has passed after pen-up, an affirmative result is obtained in the step SP70, and thus the CPU 24 also proceeds to the step SP72.

In the step SP72, the present time is read in from the timer 36, and then in a step SP73 the CPU 24 makes a judgement as to whether or not sufficient time has passed since pen-up.

This judgement is made by finding whether or not the following condition is satisfied for the present time t:

$$t-tUP>0.2 \text{ (sec)} \tag{17}$$

In this event, a negative result is obtained when the pen 6 is raised rapidly.

Thus, the CPU 24 goes to the step SP60 in which the window W is moved, and then proceeds to the step SP61 for terminating the routine.

On the other hand, when an affirmative result is obtained in the step SP73, the CPU 24 goes to a step SP74 in which the displacement after pen-up is detected.

More specifically, operations of the following equations are executed on the basis of coordinate data xEND and yEND which have been read in the step SP69 just before the coordinate data has become undetectable:

$$\Delta xUP=xEND-xUP \tag{18}$$

$$\Delta yUP=yEND-yUP \tag{19}$$

and accordingly post-pen-up displacements ΔxUP and ΔyUP are calculated.

Subsequently, the CPU 24 goes to a step SP75 in which it is judged whether or not the following condition is met:

$$|\Delta xUP|+|\Delta yUP|>10 \text{ (mm)} \tag{20}$$

and it is thereby judged whether or not the post-pen-up displacements ΔxUP and ΔyUP are sufficiently large.

In other words, the user may hold the pen 6 close to the tablet 32 for a long time after pen-up. In this case, a negative result is obtained in the step SP75, and thus the CPU 24 goes to the step SP60. This causes the CPU 24 to judge that the user's pen operation is intended to move the window W, and thus the window W is moved to the pen-up position. Then, the CPU 24 goes to the step SP61 for terminating the routine.

However, when the post-pen-up displacements ΔxUP and ΔyUP are sufficiently large, an affirmative result is obtained in the step SP75. The CPU 24 then goes to the step SP76 in which the pen-up time tUP is subtracted from the present time t to obtain the post-pen-up time ΔtUP. Then, the following operation is executed to calculate a post-pen-up travel speed vUP.

$$vUP = \frac{\Delta xUP + \Delta yUP}{\Delta tUP} \quad (21)$$

Subsequently, the CPU 24 goes to a step SP78 in which it is judged whether or not the following condition is met:

$$vUP > 300 \text{ (mm/sec)} \quad (22)$$

When this operation reveals that the post-pen-up travel speed vUP is relatively slow, the CPU 24 proceeds to the step SP60 to move the window W.

However, in the case that the post-pen-up traveling speed vUP is sufficiently fast, an affirmative result is obtained in the step SP78, Thus, the CPU 24 proceeds to a step SP79 in which the window W is stored, and then goes to the step SP61 to end the routine.

In summary, in this embodiment, the processing mode is switched on the basis of not only the traveling speed vDOWN between pen-down and pen-up, but also post-pen-up travel speed vUP. When the post-pen-up travel speed vUP is sufficiently fast, the window W is stored.

Thus, the window W can be stored by operating the pen 6 in a jumped manner, so that the information processing system 1 is enhanced in facility by simplifying the operation thereof.

Furthermore, malfunction in the case of the user becoming accustomed to the tablet 32 (as might occur in the first embodiment) is effectively avoided, and hence the information processing system 1 is further enhanced in facility.

According to the construction described above, the processing mode is switched on the basis of the post-pen-up traveling speed. When the post-pen-up traveling speed is sufficiently fast, the previously-proposed complicated storing of the window W is simplified.

(3) Other embodiments

In the first embodiment as described above, an electrical capacitance tablet is used, but the present invention is not limited to this type of tablet. Other coordinate input means, such as a write-pen, a mouse or a pressure sensitive tablet, may instead be used.

In the case of a mouse or the like, the normal state of moving the mouse corresponds to the state of pen-down.

On the other hand, in the second embodiment, coordinate inputting means, such as a write pen, for example, which is capable of detecting coordinate data even after pen-up may be used.

Furthermore, in the above description of the first and second embodiments, it is stated that the travel speed is detected in the x and y axes, but the present invention is not restricted to this. For example, the travel speed may be detected only in one of the x and y axes. Furthermore, the travel speed may be detected only in the positive or negative direction of the x or y axis. In this case, the processing mode may be switched also according to the traveling direction.

Moreover, in the above description of the second embodiment, it is stated that the processing mode is switched according to the travel speed after pen-up. However, the present invention is not limited to this and may be applied to cases where the operation mode is switched by detecting the travel speed at pen-down and after pen-up, and where the processing mode is switched on the basis of the total travel speed without considering pen-up.

In addition, in the first and second embodiments as previously described, the selected processing mode is storing the window, but the present invention is equally applicable to cases in which various other processing modes may be switched or selected; for example, the present invention may be applied to a word processor to delete inputted characters.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. An information processing apparatus comprising:
    a) coordinate information input means comprising a pen and a tablet for inputting coordinate data, said pen and tablet being coupled by electrical coupling means;
    b) processing means for processing said coordinate data;
    c) detecting means for detecting a velocity of changing said input coordinate data sequentially, said detecting means detecting said velocity of changing during a period of pressing said pen to said tablet, and for detecting whether or not said pen is pressed to said tablet;
    d) switching means for switching an operating mode of said apparatus according to said velocity of changing;
    e) said processing means having at least two operating modes, a first of said modes is selected by detecting that said velocity is at a level which is lower than a predetermined level and the pen is pressed to the tablet, and a second mode is selected by detecting that said velocity is at a level which is higher than said predetermined level and said pen is not pressed to the tablet, and means for changing the image information displayed on said display in accordance with each said mode;
    f) said velocity is detected at least in two conditions, one of said conditions is that said pen is down on said tablet so as to give a pressure to said tablet, and other said condition is that said pen is up from said tablet within a distance which can be detected by said tablet as a pen up condition.

2. An information processing apparatus according to claim 1, in which said coordinate information is inputted by means of electrostatic capacitance between said pen and said tablet.

3. An information processing apparatus according to claim 2, in which said detecting means is operable to detect a speed of change for a period during which said pen is penned up from said tablet, said electrostatic capacitance being detectable up to a predetermined distance between said pen and said tablet.

4. An information processing apparatus according to claim 2, in which said detecting means is operable to detect a first speed of change for a period during which said pen is penned down on said tablet, and a second speed of change for a period during which said pen is penned up from said tablet, said electrostatic capacitance being detectable up to a predetermined distance between said pen and said tablet.

5. An information processing apparatus according to claim 1, in which a window is moved on a display means in a first operating mode, and said window is closed on said display means in a second operating mode switched by said switching means.

6. An information processing apparatus according to claim 1 in which after said pen has been penned down to a predetermined area of said window, when said speed of change of said pen traveling on said tablet is not less than a predetermined value, said window is closed.

* * * * *